April 13, 1954 S. H. DORSEY 2,675,097
LUBRICATION SYSTEM
Filed Feb. 23, 1952 2 Sheets-Sheet 1

Sherman H. Dorsey,
Inventor.
Koenig and Pope,
Attorneys.

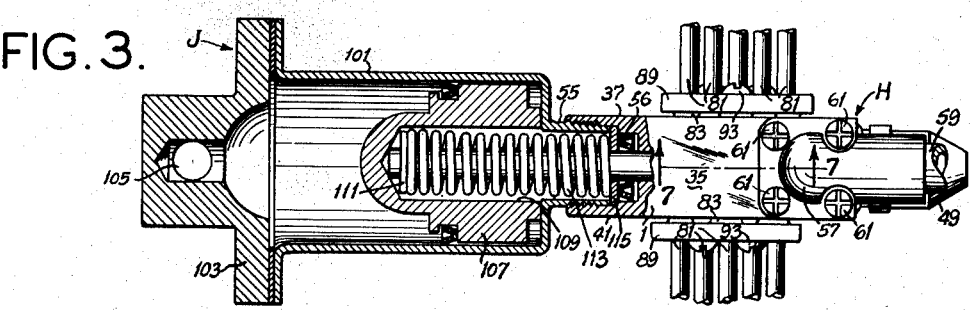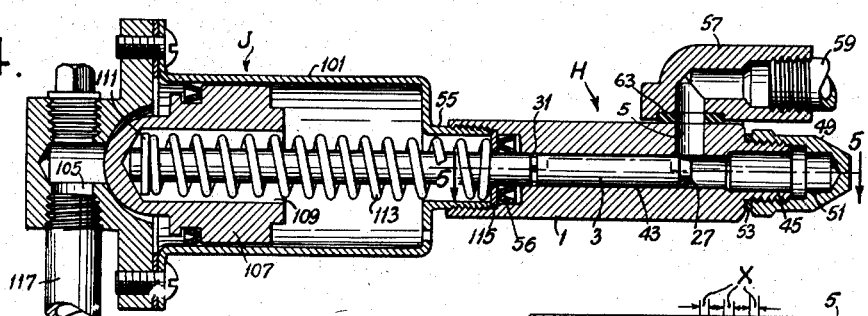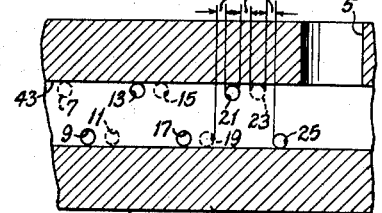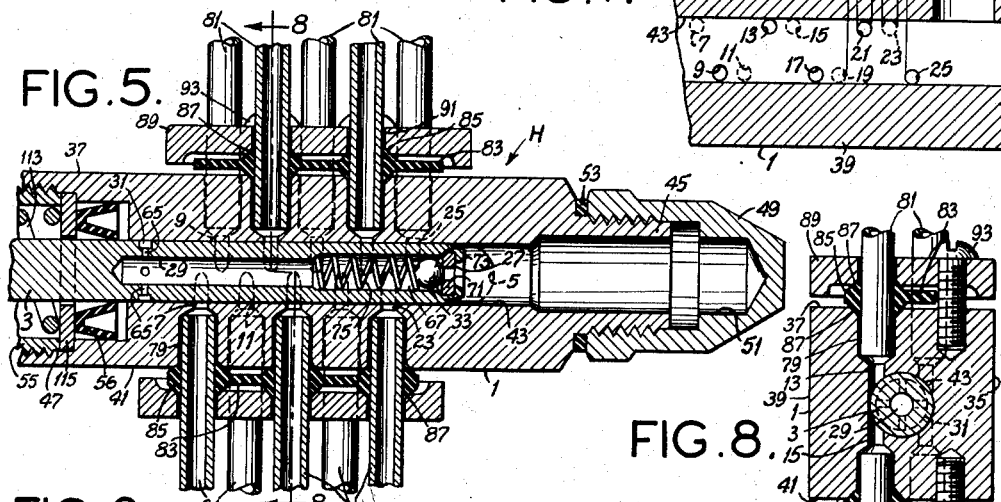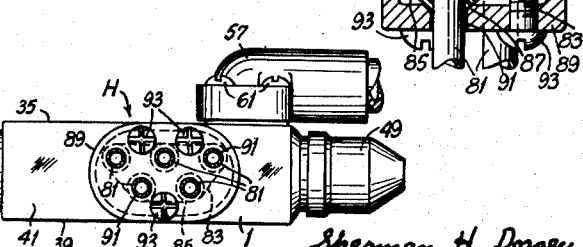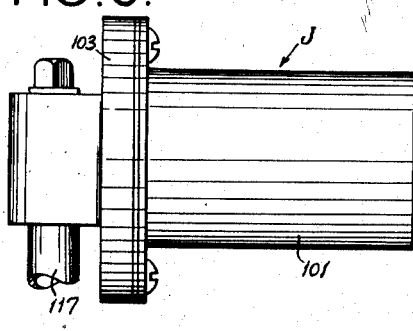

Patented Apr. 13, 1954

2,675,097

UNITED STATES PATENT OFFICE 2,675,097

LUBRICATION SYSTEM

Sherman H. Dorsey, Webster Groves, Mo., assignor to Lincoln Engineering Company, St. Louis, Mo., a corporation of Missouri Application February 23, 1952, Serial No. 272,938

1 Claim. (Cl. 184—7)

This invention relates to lubrication systems, and more particularly to a lubrication system for a trailer of a tractor-trailer combination. By "tractor" I mean a towing vehicle, such as, for example, a truck.

Among the several objects of the invention may be noted the provision of an automatic centralized lubrication system for dispensing measured charges of lubricant from a supply to points of lubrication on a trailer of a tractor (truck) and trailer combination; the provision of a lubrication system of the class described which positively insures proper lubrication of the trailer at periodic intervals without requiring any special attention on the part of the driver, the system acting automatically in response to operations essential to driving of the tractor in connection with the trailer; the provision of a lubrication system of the class described which derives power for its operation from the usual source of air pressure conventionally provided for operating the trailer brakes; the provision of a lubrication system of the class described which is operative in response to coupling and uncoupling of an air line leading from the tractor to the trailer for supplying air to operate the trailer brakes; and the provision of a lubrication system of the class described which may be readily and economically installed on existing as well as on new trailers. Other features will be in part apparent and in part pointed out hereinafter.

The invention accordingly comprises the elements and combinations of elements, features of construction, and arrangements of parts which will be exemplified in the structures hereinafter described, and the scope of which will be indicated in the following claim.

In the accompanying drawings, in which one of various possible embodiments of the invention is illustrated, Fig. 1 is a semi-diagrammatic view in elevation of a typical tractor-trailer combination in which the invention is incorporated;

Fig. 3 is a plan view of an injector constituting one element of the system, and illustrating in section an air motor associated with the injector;

Fig. 4 is a vertical longitudinal section of Fig. 3, illustrating parts in a different position from Fig. 3;

Fig. 5 is an enlarged longitudinal section of the injector at right angles to the section of Fig. 4 taken on line 5—5 of Fig. 4;

Fig. 6 is a side elevation of Fig. 3;

Fig. 7 is an enlarged diagrammatic section taken on line 7—7 of Fig. 3, illustrating the location of certain injector ports; and, Fig. 8 is a transverse section taken on line 8—8 of Fig. 5.

Similar reference characters indicate corresponding parts throughout the several views of the drawings.

This invention is primarily concerned with the lubrication of truck-towed trailers such as operated by transport companies for hauling freight. In many instances, such companies have no assurance that their trailers will receive proper periodic lubrication, required for proper trailer maintenance, since a trailer may be in transit away from its base of operations for considerable periods of time and may be towed thousands of miles by many different drivers, indifferent to trailer maintenance, before returning to its base. This invention provides an economical and reliable system whereby proper periodic lubrication of the trailer is positively insured, despite existence of such conditions, completely avoiding relying on drivers for trailer lubrication.

Figure 1:
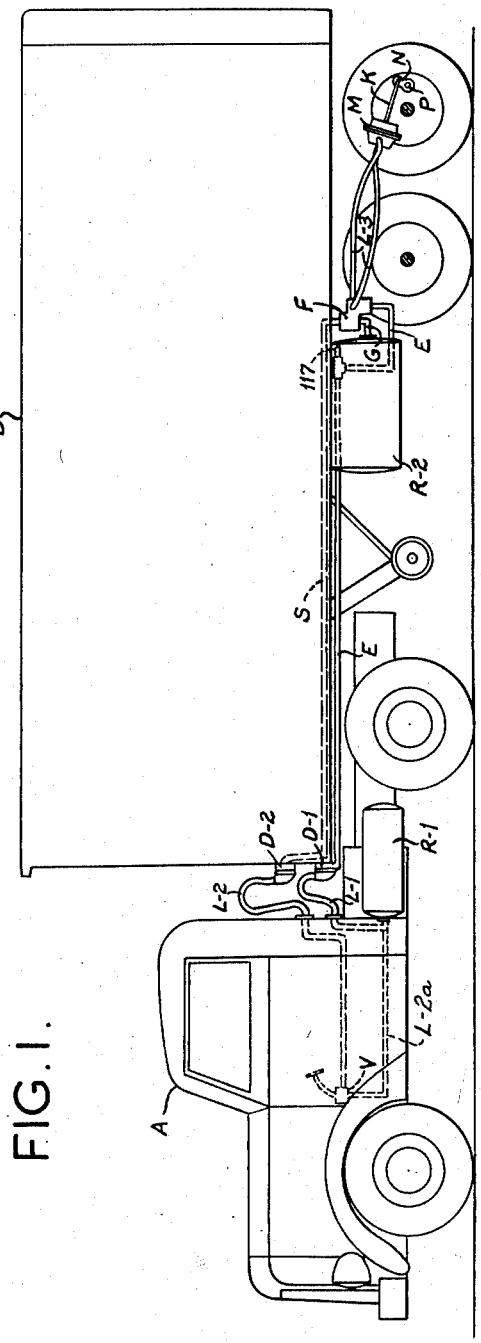
Figure 2:
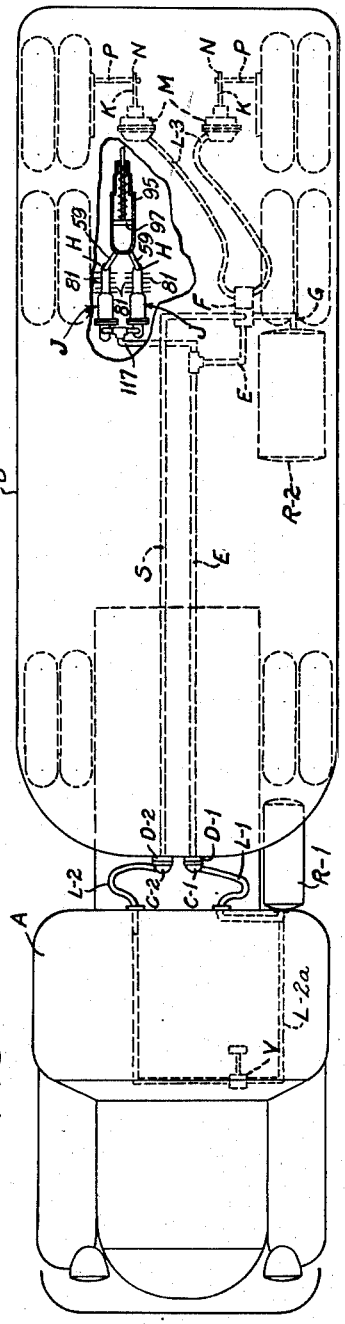
Fig. 2 is a semi-diagrammatic plan view of the lubrication system of this invention as incorporated in the tractor-trailer combination.

Referring to the drawings, Figs. 1 and 2 illustrate a conventional tractor (truck) A and a trailer B. In accordance with conventional widespread modern practice, the trailer has an air brake system in which mechanical brakes (not shown) are actuated by diaphragm-type air motors M. These brake motors are connected in an air system supplied with air under pressure from a compressed air reservoir R–1 on the tractor. It will be understood that this reservoir is maintained charged with air under pressure by a compressor (not shown) which operates when the tractor is in operation. At V is shown a valve operated by the usual foot pedal brake lever of the tractor. A hose line L–1 leads from reservoir R–1, and a hose line L–2 leads from the valve V. A line L–2a leads from the reservoir R–1 to the valve V. Lines L–1 and L–2 have hose coupling members C–1 and C–2 at their respective ends connectible with corresponding hose coupling members D–1 and D–2, respectively, at the forward end of the trailer. The hose coupling members will not be described in detail, being well-known in the art. A so-called emergency line E leads from the coupling member D–1 and a so-called service line S leads from coupling element D–2 to a so-called relay emergency valve F. The trailer carries a compressed air reservoir R–2 connected by a line G to the relay emergency valve. Hose lines L–3 connect the relay emergency valve to the brake motors M.

The relay emergency valve F is of a known type which acts to control the operation of brake motors M in response to actuation of the brake pedal, and which also acts automatically to apply the trailer brakes whenever the trailer is uncoupled from the tractor with attendant uncoupling of members C-1 and C-2 from members D-1 and D-2 after parking of the trailer, or in the event that the trailer should break away from the tractor. A relay emergency valve suitable for the purpose is a Bendix-Westinghouse RE-1 or RE-1C relay emergency valve, manufactured by the Bendix-Westinghouse Automotive Air Brake Company of Elyria, Ohio, and described in said company's Instruction Pamphlet No. 5072-A, dated April 1949. Full details of operation of the brake system may be ascertained from said pamphlet. For the purposes of this invention, it is only essential to understand that air under pressure is supplied from the reservoir R-1 through line L-1, coupling members C-1 and D-1 and emergency line E to the relay emergency valve F whenever members C-1 and D-1 are coupled together upon coupling the tractor to the trailer, and that emergency line E is vented to atmosphere at coupling member D-1 upon disconnection of C-1 from D-1. Assuming that lines L-1 and L-2 are coupled to the trailer, air flows from the reservoir R-1 through the emergency line E, the relay emergency valve F and into the trailer reservoir R-2 to charge the latter. When the tractor brake pedal is depressed, the brake valve V acts to deliver air through line L-2 and service line S to the relay emergency valve, which thereupon acts to allow flow of air from the trailer reservoir R-2 to the brake motors M to apply the trailer brakes. The diaphragms of motors M are coupled by connecting rods K to crank arms N on brake-operating shafts P. Upon supply of air to the motors M, the diaphragms act through the connecting rods and crank arms to rotate the shafts P and thereby apply the brakes. The diaphragms are spring-returned to brake-released positions. Whenever there is a rapid pressure drop in the emergency line E (as upon uncoupling of member C-1 from D-1 and venting of line E), air flows from the trailer reservoir R-2 to the motors M to apply the brakes.

In accordance with this invention, I provide on the trailer, and fixed at any suitable location thereon, one or more multiple injector means generally designated H, and to be more particularly described, for dispensing measured charges of lubricant from a supply to points of lubrication on the trailer. Two injectors are shown in Fig. 2. Each injector (dispensing means) is operated by an air motor J. The air motors J are supplied with air from the emergency line E, and act intermittently to operate the injectors each time that a tractor is coupled to the trailer and the tractor hose line L-1 is coupled to the trailer at D-1. The motors are vented whenever coupling member C-1 at the end of the hose line L-1 is uncoupled from member D-1.

Each injector H, as illustrated herein, is of a type disclosed in the copending coassigned application of Victor G. Klein and Carl H. Mueller, entitled Injector, Serial No. 255,828, filed November 10, 1951. Referring to Figs. 3-8, injector H is shown to comprise a cylinder 1 closed at one end, this end being its right end as illustrated. A plunger 3 is movable in the cylinder toward and away from its closed end. The cylinder has a lateral inlet port 5 spaced from its closed end, and a series of ten longitudinally spaced lateral outlet ports 7, 9, 11, 13, 15, 17, 19, 21, 23 and 25 between its other end and the inlet port 5. The working end of the plunger toward the closed end of the cylinder is designated 27. The plunger is made hollow for some distance from its working end 27 to provide a longitudinal passage 29 for communication from the space in the cylinder between the working end of the plunger and the closed end of the cylinder to a lateral port 31 in the plunger spaced from its working end 27. The length of the passage 29 is greater than the longitudinal extent of the series of cylinder ports. In the passage 29 is a ball check valve 33 adapted to open upon movement of the plunger toward the closed end of the cylinder. Figs. 4 and 5 illustrate the plunger in a charging position, wherein its working end 27 is retracted past the inlet port 5, and the plunger is movable from this charging position toward the closed end of the cylinder through a pressure stroke successively to force out individual charges through the outlet ports 7 to 25 as the lateral plunger port 31 passes the outlet ports.

More particularly, the cylinder 1 comprises an elongate cylinder block of generally square cross section, thereby having four flat sides 35, 37, 39 and 41, and having a central longitudinal bore 43 with an externally threaded cylindrical extension 45 at its right end and a counterbore 47 in its left end. The right end of the cylinder is closed by a head 49 threaded on the extension 45. The head has a closed-end bore 51 forming a continuation of the bore 43. Packing 53 is compressed between the end of the head and the shoulder at the root of extension 45 for sealing purposes. The plunger extends out of the left end of the cylinder into the motor J which has a cylindrical projection 55 threaded in the left counterbore 47. The projection holds in place packing 56.

The inlet port 5 leads laterally into the bore 43 from the side 35 of the cylinder 1. An elbow fitting 57 for connection of a lubricant supply line 59 for supplying lubricant to the injector through the inlet port is secured on the side 35 of the cylinder 1 by screws 61. The cylinder and fitting have four screw holes located on the corners of a square so that the fitting may be oriented in any one of four angular positions. Packing 63 is compressed between the fitting and the side 35. The plunger 3 has a close sliding fit in the bore 43. The lateral port 31 in the plunger is formed as an annular peripheral groove with radial openings 65 from the passage 29 to the groove. The passage 29 is formed by boring the plunger, then counterboring to form a valve chamber 67. A valve seat 71 is fitted in a short counterbore at the outer end of chamber 67 and held therein by peening over the end of the plunger as indicated at 73. This is accomplished after insertion of the ball 33 and a spring 75 which reacts from the shoulder at the inner end of the valve chamber 67 to bias the ball toward the valve seat 71.

The successive outlet ports 7 to 25 are successively angularly offset. Five of the outlet ports are located in one side of the cylinder, and the remaining five are located in the opposite side of the cylinder. The side 39 of the cylinder opposite the inlet port 5 is completely closed. As shown herein, the outlet ports 9, 13, 17, 21 and 25 lead laterally out of the bore 43 to the side 37 of the cylinder. The outlet ports 7, 11, 15, 19 and 23 lead laterally out of the bore 43 to the side 41 of the cylinder. Each outlet port is counterbored at its outer end to form a socket for receiving the end of a lubricant delivery line.

The sockets are all designated by the reference character 79, and the delivery lines (tubes) are all designated by the reference character 81. Lines 81 lead to various points of lubrication on the trailer. Outlet ports 9, 13, 17, 21 and 25 are staggered, the ports 9, 17 and 25 and the ports 13 and 21 being located in two different rows in the side 37 of the cylinder; and, similarly, outlet ports 7, 11, 15, 19 and 23 are staggered, the ports 11, 19 and 25 and the ports 15 and 23 being arranged in two different rows in the side 41 of the cylinder.

For connecting the individual lubricant delivery lines to the cylinder and for packing the connections to prevent leakage, on each of the sides 37 and 41 of the cylinder there is used a packing member comprising an integral formation of a web 83 and a plurality of ferrules 85. The number and arrangement of the ferrules corresponds to the number and arrangement of the sockets or openings 79 in one side of the cylinder. The openings through the ferrules are of such size as originally slidably to receive the delivery lines or tubes 81. The ferrules extend on opposite sides of the web 83, so that packing members may be used interchangeably on the opposite sides of the cylinder, and taper toward their outer ends as indicated at 87. The packing member is preferably made of a relatively soft plastic material, such as polyvinylidene chloride, which may be obtained under the trade name Saran. A follower 89 is used with the packing member. This consists of a flanged plate having openings 91 in number and arrangement corresponding to the number and arrangement of ferrules.

In connecting the lubricant lines 81 to the cylinder, the lines are inserted through the openings in the follower 89 and the ferrules 85 of the packing member, and the latter is then applied against the side of the cylinder with the tapered ends of the ferrules toward the cylinder engaged in the sockets for the lubricant lines and the tapered ends of the ferrules away from the cylinder engaged in the openings in the follower. The follower is secured to the cylinder by screws 93, the screws being tightened sufficiently to effect a radial compression of the ferrules into sealing engagement with the lubricant lines.

When the plunger is in the Fig. 5 charging position, lubricant flows from the inlet port 5 directly into the space in the cylinder between the working end 27 of the plunger and the closed end of the cylinder, the lateral port or groove 31 being blocked. The relation of the longitudinal spacing of the successive outlet ports 7 to 25 and of the last outlet port 25 and the inlet port 5 to the width of the groove 31 is such that as the plunger is moved from its charging position toward the closed end of the cylinder through a pressure stroke, the groove 31 comes into communication with the first outlet port 7 as the end 27 of the plunger blocks off the inlet port 5, and then comes into communication with each successive outlet port as it passes out of communication with the preceding outlet port. This is accomplished by making the intervals between the successive outlet ports equal to the width of the groove 31. By "interval" is meant the distance in the longitudinal direction from the trailing edge of any port (its right edge nearest the closed end of the cylinder) to the leading edge (the left edge farthest from the closed end of the cylinder) of the next successive port. These intervals are indicated at X in Fig. 7, each being equal to the width of the groove 31. The distance from the working end 27 of the plunger to the right edge of the groove 31 is made equal to the distance from the right edge of the inlet port 5 to the left edge of the first outlet port 7 so that the groove comes into communication with the first outlet port 7 as the plunger reaches the position where it blocks off the inlet port 5.

When the plunger is driven from its charging position illustrated in Fig. 5 to the right toward the closed end of the cylinder, lubricant is displaced from within the space in the cylinder between the working end 27 of the plunger and the closed end of the cylinder outward through the inlet port 5 until the plunger reaches a position wherein it blocks off the inlet port and wherein the right edge of the groove 31 first encounters the leading (left) edge of the first outlet port 7. Then, as the groove 31 passes by the outlet port 7, the valve 33 opens and a charge of lubricant is forced out from the cylinder through the passage 29, the radial ports 65, the groove 31 and the outlet port 7 in amount determined by the displacement of the plunger as it moves through the complete distance over which the groove 31 is open to the port 7. It will be seen that this distance is equivalent to twice the width of the groove 31 plus the width (diameter) of the port 7.

As the plunger continues its pressure stroke, the right edge of the groove 31 next encounters the leading (left) edge of the next outlet port 9, as the left edge of the groove 31 is cut off from the preceding port 7. Then as the groove 31 passes by the port 9, a charge of lubricant is forced out of the cylinder through the outlet port 9 in amount the same as previously discharged through the port 7. This action is repeated as the groove 31 passes by the remaining outlet ports 11 to 25. Thus, as the plunger is driven through a pressure stroke from its charging position, equal charges are forced out of the cylinder successively through the outlet ports 7 to 25 one after another. Upon return of the plunger to charging position (Fig. 5), the cylinder is recharged with lubricant for the next cycle of operation.

As shown in Fig. 2, the two injectors H are supplied with lubricant from a trailer-mounted supply cylinder 95 having two outlets connected by lines 59 to the injector inlet fittings 57. Lubricant in the cylinder is forced toward the injectors by a spring-biased piston 97.

Each motor J comprises a cylinder 101 formed at one end with the aforesaid projection 55, and having a head 103 at its other end. In the head is a port 105. A piston 107 is slidable in the cylinder. The plunger extends into a recess 109 in the piston. On the end of the plunger in the recess is a collar 111. A coil compression spring 113 is compressed between the collar and a packing retainer 115 at the end of projection 55. The arrangement is such that upon admission of air to the cylinder through the port 105, the piston 107 is driven to the right as viewed in Fig. 3 against the bias of spring 113 to drive the plunger 3 from its charging position through a pressure stroke. Upon venting the cylinder through the port 105, the spring returns the plunger to charging position, the plunger pushing the piston 107 to its retracted position against the head 103 illustrated in Fig. 4. As illustrated in Fig. 2, the ports 105 of the two air motors J are both connected to the emergency line E by a line 117.

Operation is as follows:

Whenever the coupling member C-1 is disconnected from the coupling member D-1, as when the tractor is uncoupled from the trailer after parking, each of the air motors J is vented to atmosphere through the line 117 and the line E. (This also results in application of the trailer brakes.) Under these circumstances, the air motor pistons 107 are retracted by their springs 113 and the plungers 3 of each of the injectors H are in the charging position illustrated in Figs. 4 and 5. Upon coupling the line L-1 to the trailer, as always occurs in coupling the tractor to the trailer for driving of the tractor and the trailer, air under pressure is supplied through emergency line E to the air motors J thereby to drive the injector plungers 3 through a pressure stroke. This results in the dispensing of measured charges as above described through the lubricant lines 81 to the points of lubrication of the trailer to which the lubricant lines are connected. The plungers 3 remain in position at the end of their pressure stroke (Fig. 3) as long as there is air under pressure behind the pistons 107 in the cylinders 101 of the motors J. The next time the line L-1 is uncoupled from the trailer, as occurs the next time the trailer is parked and the tractor uncoupled, the air motors are vented through the line 117 and the line E, and the plungers 3 are returned by springs 113 to their charging positions for recharging of the injectors with lubricant from supply cylinder 95. The next time the line L-1 is coupled to the trailer, as when the trailer is next picked up for towing, the injectors are again operated to dispense measured charges of lubricant, and so on.

From the above, it will be seen that the injectors are operated intermittently to dispense measured charges of lubricant from the supply to the points of lubrication on the trailer each time a tractor is coupled to the trailer for towing the trailer, the coupling of the tractor to the trailer necessitating the coupling of line L-1 to the trailer in order to release the trailer brakes so that the trailer may be towed. Thus, lubrication of the trailer every time that a tractor is coupled thereto is insured simply in response to operations incident to driving of the tractor in connection with the trailer. This assures that the trailer will be lubricated even though it may not return to its base of operations for a considerable period of time and may be driven many thousands of miles in the interim, inasmuch as in the normal course of hauling the trailer will be parked at frequently recurring intervals and there will be frequent occurrences of coupling and uncoupling of a tractor thereto.

It will be understood that only one injector may be needed, or that more than two injectors may be used, this depending upon the number of points of lubrication and the number of outlets per injector. Using the injector herein illustrated having ten outlets, two are usually sufficient to take care of the usual trailer. It will also be understood that, if desired, provision may be made for lubricating one or more points of lubrication on the tractor from an injector, though this may require the provision of disconnectible lubricant lines.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

In a trailer having an air brake system including a compressed air reservoir, an air supply line which is supplied with compressed air through a disconnectible coupling from a source on a tractor coupled to the trailer, said line being connected to the reservoir via valve means acting to maintain the reservoir charged and said line holding compressed air throughout periods of connection at said coupling and being vented to atmosphere only upon disconnection at said coupling, a lubrication system for the trailer comprising means for dispensing measured charges of lubricant from a supply on the trailer to individual points of lubrication on the trailer, said dispensing means including a reciprocating plunger adapted upon movement in one direction to effect dispensing of lubricant and upon movement in the opposite direction to effect recharging of the dispensing means, an air motor comprising a cylinder and a piston working in the cylinder coupled to the plunger, said cylinder having a connection to said air line at a point between said coupling and said valve means so that, upon making the connection at said coupling to supply said line with compressed air, the piston and plunger are moved through a stroke in one direction and held at the end of said stroke, and means biasing the piston and plunger in the opposite direction so that, upon disconnection at said coupling and concomitant venting of the air line, the piston and plunger are biased through a stroke in the opposite direction, whereby lubrication is effected in response to the acts of connection and disconnection at said coupling.

References Cited in the file of this patent

UNITED STATES PATENTS

| Number | Name | Date |
|---|---|---|
| 1,987,256 | Johnson | Jan. 8, 1935 |

FOREIGN PATENTS

| Number | Country | Date |
|---|---|---|
| 259,660 | Italy | July 21, 1928 |